United States Patent
Deines et al.

(10) Patent No.: US 6,297,769 B1
(45) Date of Patent: *Oct. 2, 2001

(54) SYSTEM AND METHOD TO ESTIMATE CARRIER SIGNAL IN GLOBAL POSITIONING SYSTEMS (GPS)

(75) Inventors: Steven D. Deines, Marion; Paul D. Linhart, Cedar Rapids, both of IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/507,876

(22) Filed: Feb. 22, 2000

(51) Int. Cl.[7] .................................................. H04B 7/185
(52) U.S. Cl. ........................................................ 342/357.12
(58) Field of Search ...................... 342/357.12, 357.06; 701/213

(56) References Cited

U.S. PATENT DOCUMENTS

| | | | |
|---|---|---|---|
| 4,644,358 | * | 2/1987 | Sekine .................................. 342/356 |
| 4,894,662 | * | 1/1990 | Counselman .......................... 342/357 |
| 4,949,268 | * | 8/1990 | Nishikawa et al. ................... 364/449 |
| 5,451,964 | | 9/1995 | Babu ..................................... 342/357 |
| 5,506,588 | | 4/1996 | Diefes et al. ......................... 342/357 |
| 5,534,875 | | 7/1996 | Diefes et al. ......................... 342/357 |
| 5,543,804 | | 8/1996 | Buchler et al. ....................... 342/357 |
| 5,546,309 | | 8/1996 | Johnson et al. ...................... 364/434 |
| 5,548,293 | | 8/1996 | Cohen ................................... 342/357 |
| 5,787,384 | | 7/1998 | Johnson ............................... 701/216 |
| 5,805,108 | * | 9/1998 | Lennen ................................. 342/357 |
| 5,923,287 | * | 7/1999 | Lennen ................................. 342/357 |
| 5,990,827 | * | 11/1999 | Fan et al. ......................... 342/357.11 |

\* cited by examiner

*Primary Examiner*—Dao Phan
(74) *Attorney, Agent, or Firm*—Nathan O. Jensen; Kyle Eppele

(57) ABSTRACT

A method of estimating the carrier phase difference between two antennas under low signal conditions (typically called state 3) of a global positioning system (GPS) carrier signal transmitted from one of a constellation of satellites in the GPS for use in attitude determination systems is proposed. The method involves the use of multiple antennas tracking the same satellite signal and utilizing a code tracking loop filter to aid in maintaining track of the GPS waveform when the effects of doppler (i.e., the distance from a GPS satellite to the antenna is changing with time) are present.

20 Claims, 2 Drawing Sheets

SYSTEM AND METHOD TO ESTIMATE CARRIER SIGNAL IN GLOBAL POSITIONING SYSTEMS (GPS)

RELATED APPLICATIONS

The present application is related to U.S. patent application Ser. No. 09/510,915, filed on an even date herewith, entitled, "System And Method For Attitude Determination In Global Positioning Systems (GPS)" by Deines et al, assigned to the assignee of the present application.

FIELD OF THE INVENTION

The present invention relates generally to systems and methods for generating precise location determinations for moving vehicles. In particular, it pertains to a system and method for generating location determinations for moving vehicles, including aircraft and spacecraft, using the Global Positioning System (GPS).

BACKGROUND OF THE INVENTION

The Global Positing System (GPS) is a satellite-based navigation system that continuously transmits timing, frequency, and satellite position information to potential users. The GPS consists of a full constellation of twenty-four (24) satellites in half geosynchronous orbits. The position of the GPS satellites is controlled and monitored by the Department of Defense (DoD). GPS satellites continuously emit coded GPS signals. The GPS signal contains timing information that allows a user to determine the time elapsed for the GPS signal to transverse the distance between the GPS satellite and the user (the platform). By knowing the time the GPS signal left the GPS satellite, the time the GPS signal arrived at the user, and the speed of the GPS signal, the user can determine the distance from itself to the GPS satellite. By knowing the position of the GPS satellite (ephemeris data), and the distance from itself to the GPS satellite, the user can successfully triangulate its own position.

The GPS signal emitted by the satellites contains an L-band carrier component (L1) transmitted at a frequency of 1575.42 MHz. The L1 carrier component is modulated by a coarse acquisition (C/A) pseudorandom (PRN) code component and a data component. The PRN code provides timing information for determining when the GPS signal was broadcast. The data component provides information such as the satellite's orbital position. The carrier component allows a receiver to more easily acquire the GPS signal.

Position determination using a conventional GPS receiver is well known in the art. In conventional GPS, a receiver makes ranging measurements between an antenna coupled to the receiver and each of at least four GPS satellites in view. The receiver makes these measurements from the timing information and the satellite orbital position information obtained from the PRN code and data components of each GPS signal received. By receiving at least four different GPS signals, the receiver can make fairly accurate time and position determinations.

However, a conventional GPS receiver only allows a user to determine actual location to within tens of meters. This accuracy is not suitable for applications which require extreme precision, such as attitude determination for moving vehicles.

A more accurate version of a GPS receiver is an Ordinary Differential GPS receiver. Position determination using Ordinary Differential GPS receiver is also well known in the art. It involves the same kind of ranging measurements that are made with a conventional GPS receiver, except that a ground reference receiver at a precisely known location is utilized. Ideally, satellite ranging errors will affect the position determinations made by the user's receiver in the same way as they will the position determinations made by the nearby ground receiver. Since the location of the ground receiver is already known, the ground receiver can compare the position determination it has calculated with the actual known position. As a result, the ground receiver can accurately detect ranging errors.

From these errors, the ground receiver can compute suitable corrections which are transmitted by data link to the user's receiver. The user's receiver can then apply the corrections to its own ranging measurements so as to provide accurate real time position determinations.

However, even with the Ordinary Differential GPS receiver, the position determinations are only accurate to within several meters. Since, as indicated earlier, attitude determination must be extremely accurate, extending Ordinary Differential GPS to attitude determination is not feasible.

An even more accurate form of a GPS receiver is a Carrier Phase Differential GPS receiver. This form of the GPS receiver utilizes the 1575.42 MHz (L1) carrier component of the GPS signal on which the PRN code and the data component are superimposed. Carrier Phase Differential GPS involves generating position determinations based on the measured phase differences at two different antennas for the carrier component of a GPS signal. However, this technique initially requires determining how many integer wavelengths of the carrier component exist between the two antennas at a particular point in time. This is called integer ambiguity resolution.

As described, a Carrier Phase Differential GPS receiver must be able to accurately detect the carrier signal to make precise determinations of phase differences and numbers of wavelengths. Under weak signal conditions, the carrier cannot be properly detected (a state known as the GPS State 3). The conventional solution for this problem has been the use of Kalman filtering. Kalman filtering is not one unique method, but is a generic name for a class of state estimators based on noisy measurements. Kalman filtering can be implemented as a specific algorithm on a general-purpose mainframe/ mini/ microcomputer operating in a batch mode or it can be implemented on a dedicated system using either DSP, ASIC, or custom VLSI processors in a real-time operating mode.

In GPS receivers, Kalman filters estimate systematic errors from the GPS navigation data. Kalman filters are able to provide the GPS with 1 Hz error updates. Quicker updates would provide more accurate estimations of carrier signals and, thus, more accurate phase determinations used, for example, to calculate attitude of the platform. Nevertheless, even when the GPS carrier signal is strong enough to be detected (a state known as the GPS State 5), conventional GPS receiver designs have the problem of carrier cycle slip in their carrier measurements. As such, GPS carrier estimation is useful even when the carrier signal is not jammed or indiscernible.

Thus, there is a need for an improved system and method to estimate the waveform of the carrier signal of global positioning systems (GPS). Further, there is a need for more accurate location and attitude determinations when tracking of the carrier signal is not possible (GPS State 3). Further still, there is a need to have an external measurement to detect any carrier cycle slips when detection of the carrier signal is possible (GPS State 5).

SUMMARY OF THE INVENTION

One embodiment of the invention relates to a system for estimating the waveform of a global positioning system (GPS) carrier signal transmitted from at least one of a constellation of satellites in the GPS. The system includes an antenna and a receiver. The antenna is capable of receiving GPS signals. The receiver estimates how fast the distance from a GPS satellite to the antenna is changing by determining the rate of change of a locally-generated code sequence as it changes to approximate the GPS signal transmitted by the GPS satellite.

Briefly, according to other aspects of the present invention, there are provided means for receiving GPS signals; means for generating a code sequence for comparison with the received GPS signals; means for regulating the rate of the means for generating a code sequence; means for regulating the rate by which a locally-generated signal is mixed with the received GPS signal; means for measuring code phase error in the GPS signal mixed with the locally-generated signal; and means for determining the rate of change required of the regulating means, wherein the rate of change required of the regulating means corresponds to how fast the distance from the GPS satellite to the antenna is changing.

Briefly, according to another aspect of the present invention, there is provided a method of estimating the waveform of a global positioning system (GPS) carrier signal transmitted from one of a constellation of satellites in the GPS. The method includes receiving a GPS signal into a receiving unit and estimating how fast the distance from a GPS satellite to the antenna is changing by the rate of change of a locally-generated phase sequence as it changes to approximate the GPS signal transmitted by the GPS satellite.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
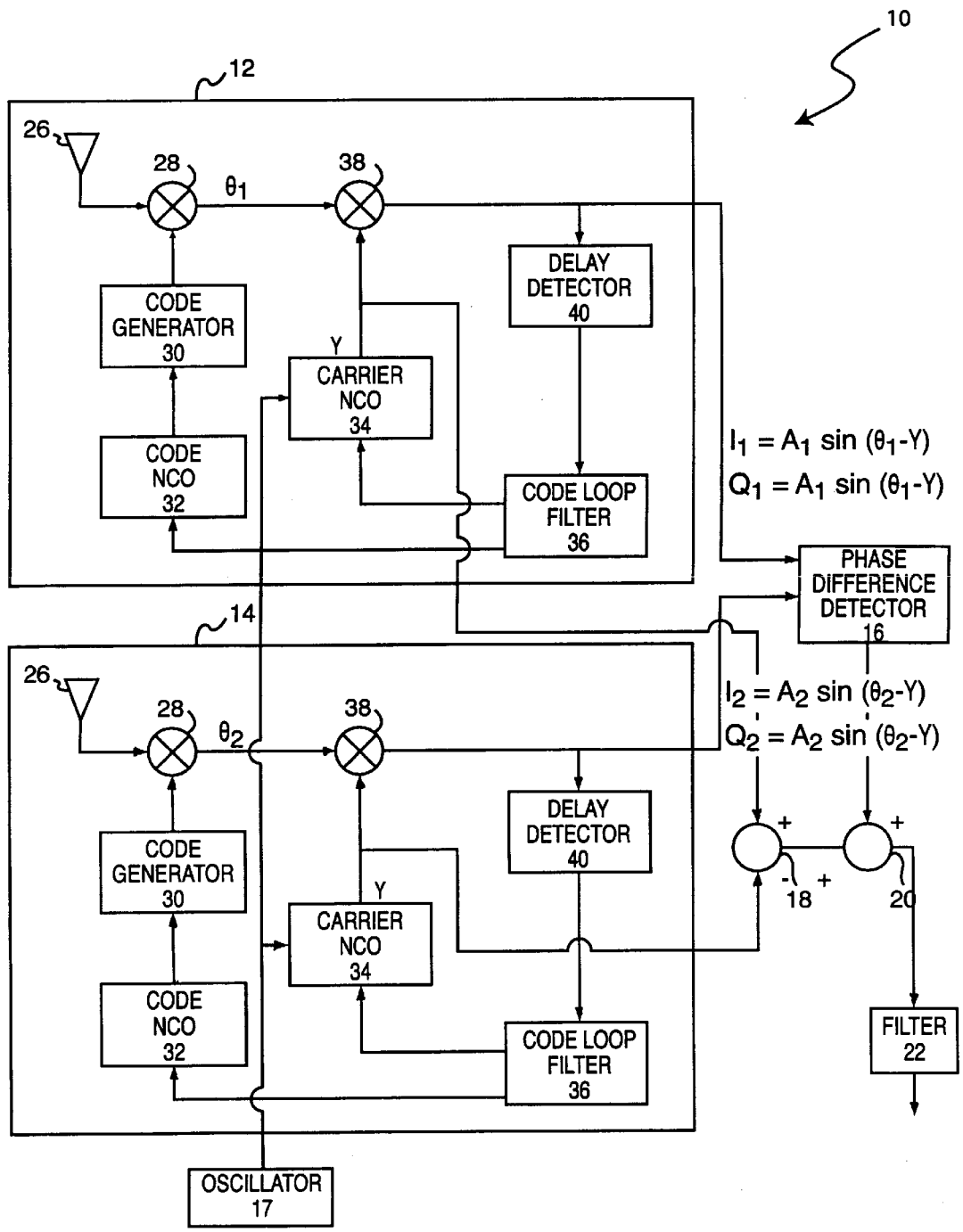
FIG. 1 is a block diagram of a system to estimate the waveform of a GPS carrier signal in accordance with an exemplary embodiment of the present invention.

FIG. 1 illustrates a block diagram of a system 10 wherein the waveform of a GPS carrier signal is estimated. Alternatively, system 10 could be configured for use in a GLONAS or other positioning system. Such an estimation of the GPS carrier signal is particularly helpful to GPS determinations in GPS State 3 (i.e. the GPS state where the carrier signal cannot be easily detected but the code signal can be detected). System 10 is only illustrative of one embodiment of the present invention. Other embodiments of system 10 may include a variety of combinations of antennae, receivers and other components.

System 10 includes GPS receivers 12 and 14, a phase difference detector 16, a subtractor 18, an adder 20, and a filter 22. GPS receivers 12 and 14 receive a number of GPS signals from a number of GPS satellites. (Preferably, each receiver 12 and 14 receive at least four (4) GPS signals.) Receivers 12 and 14 produce base band representations (or estimations) of the GPS signals they receive. The base band representations of GPS signals are individually input to phase difference detector 16. Phase difference detector 16 generates the difference in phase between the GPS signal representation for a particular satellite from receiver 12 and the GPS signal representation for the same particular satellite from receiver 14. The calculated phase difference output from phase difference detector is used for location, attitude, and other GPS determinations.

In a presently preferred embodiment, the following functional circuitry may be configured as hardware, firmware, or software on any appropriate computer platform. Description of functional circuitry does not limit the presently preferred embodiment to hardware, software, or any other implementation. Subtractor 18 is any of a variety of electrical components which receives two signals and subtracts one from the other. In one embodiment of system 10, subtractor 18 takes as its inputs a locally-generated carrier signal from receiver 12 and a locally-generated carrier signal from receiver 14. Subtractor 18 subtracts the signals to determine which of the two receivers (i.e., receiver 12 or 14) is leading (i.e. closer in distance to a particular GPS satellite).

Adder 20 is any of a variety of electrical components or software which adds two signals it receives as inputs. In one embodiment of system 10, adder 20 combines the information on which signal is leading (received from subtractor 18) and the phase difference (received from the phase difference detector 16). Adder 20 outputs the combination to filter 22, which filters the signal and produces a representation of the phase difference. As mentioned previously, a variety of different GPS applications use a calculated phase difference between received GPS signals for many different calculations, including attitude, location, and other GPS determinations.

In an exemplary embodiment of system 10, GPS receivers 12 and 14 each include an antenna 26, a mixer 28, a code generator 30, a code numerically controlled oscillator (NCO) 32, a carrier numerically controlled oscillator (NCO) 34, a code loop filter 36, a mixer 38, and a delay detector 40. Receivers 12 and 14 can be integral with each other or be distinct units coupled to filter 22 and detector 16.

Antenna 26 can be any of a variety of antennae capable of receiving GPS or other positioning systems signals. Mixer 28 is any of a variety of electrical components which combine input signals. In system 10, mixer 28 receives as inputs the received GPS signal from antenna 26 as well as a locally-generated code sequence signal from code generator 30. Mixer 28 performs a down conversion in which the signal frequency is reduced and the code sequence is taken from the received GPS signal carrier. Mixer 28 extracts the code sequence by comparing the received GPS carrier signal with the locally-generated code sequence from code generator 30. The output mixer 28 generates a base band version of the GPS signal, including an I and a Q portion. The I and Q portions represent both the combination of the locally-generated code sequence and the received GPS carrier signal as well as the phase angle between the locally-generated code sequence signal and the GPS received signal.

Code generator 30 is a pseudorandom (PRN) code local code generator which produces a PRN code sequence signal. Each satellite in the GPS includes its own PRN code. The PRN codes are known by receivers and are used to identify which GPS signals are coming from which of the 24 GPS satellites. Thus, code generator 30 produces a PRN code corresponding to the satellite from which receiver 12 (or 14) is receiving a GPS signal. Code generator 30 can be of a different type depending on the implementation of system 10. The locally-generated code sequence from code generator 30 is input along with the received GPS signal to mixer 28.

Code NCO 32 is an oscillator which regulates code generator 30, instructing code generator 30 to increase or decrease the rate of PRN code generation, based on information received from code loop filter 36.

Carrier NCO 34 is an oscillator which determines the rate by which a locally-generated carrier signal is mixed with the base band version of the incoming GPS signal as output by mixer 28. Carrier NCO 34 increases or decreases the rate of the locally-generated carrier signal based on information received from code loop filter 36.

Figure 2:
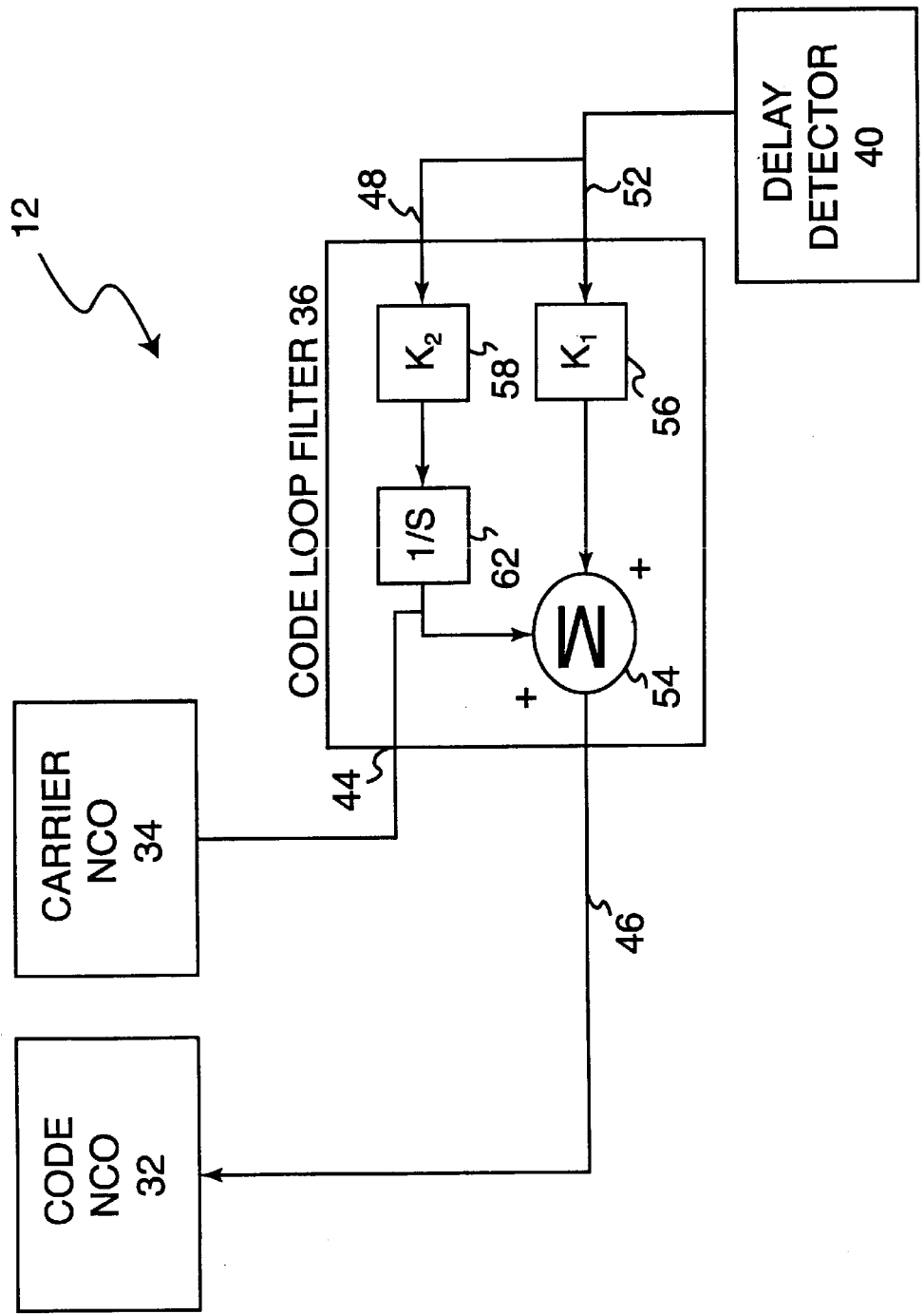
FIG. 2 is a code loop filter of the system in FIG. 1 shown in greater detail.

Code loop filter 36, shown in greater detail in FIG. 2, is a circuit component or software that generates a rate command for code NCO 32 and carrier NCO 34. Code loop filter 36 includes an output 44, an output 46, an input 48, and an input 52. Filter 36 further includes a summer 54, a scalar 56, a scalar 58, and an integrator 62. Code loop filter 36 generates the rate command by scaling a code phase error received from delay detector 40 at input 48 with scalar 58 and the code phase error from delay detector 40 at input 52 with scalar 56. The code phase error is scaled by loop gain parameter kl in scalar 56 and parameter k2 in scalar 58. The scaled code phase error from scalar 58 is integrated by integrator 62. The result of the integration from integrator 62-the rate command—is also a velocity estimate because the rate at which the locally-generated code needs to change (i.e. the integral of the scaled code phase error) corresponds to how fast the distance from the GPS satellite is changing (i.e. the relative velocity). The rate command is provided at output 44 to carrier NCO 34.

In one particular embodiment of system 10, the rate command sent to code NCO 32 from output 46 differs from the rate command sent to carrier NCO 34 from output 44 in that the rate command to code NCO 32 adds an error signal parameter (k1) to the velocity estimate.

Referring again now to FIG. 1, mixer 38 accepts as inputs the GPS signal output from mixer 28 and the locally-generated carrier signal output from the carrier NCO 34. Output from mixer 38 is the base band version of the GPS signal.

Delay detector 40 is any of a variety of electrical components or software which is configured to measure error in the code phase of the GPS signal. Such error measurement may be done by a variety of ways. In one embodiment of system 10, delay detector 40 can represent a dot product detector. Such a detector estimates the code phase error by calculating the dot product of the prompt GPS baseband signal vector and a ½ codechip early (i.e., locally generated code sequence signal shifted forward by half a codechip) minus ½ codechip late (i.e., locally generated code sequence signal shifted back by half a codechip) GPS baseband signal vector. Note that each of the GPS baseband signal vectors is generated from the output of mixer 28 followed by carrier frequency down conversion to baseband via mixer 38. The dot product quantity is often normalized by the prompt signal power (again formed from the output of mixer 38 so that the overall closed loop behavior is more controllable. Delay detector 40 sends its measurement of the code phase error to code loop filter 36. Code loop filter 36, as discussed above, instructs code NCO 32 and carrier NCO on how to adjust the locally-generated code sequence and carrier phase, respectively, to more accurately approximate the GPS signal transmitted by the GPS satellite.

In operation, system 10 provides for enhanced GPS performance by providing a more accurate estimate of the carrier waveform received from GPS satellites. Such an estimate is particularly important in GPS State 3. GPS signals received during State 3 include only the GPS code and not a determinable GPS carrier signal. However, estimates of the carrier waveform are also helpful to verify the carrier waveform when the carrier can be detected (in GPS State 5, for example).

Conventional systems estimate the waveform of the GPS carrier signal under weak signal conditions using a Kalman filter operating at 1 Hz. In contrast, system 10 provides a second order code tracking loop at a 50 Hz rate to get an estimated measurement of the GPS receiver velocity at its antenna. Using this velocity measurement (output by code loop filter 36) and the last actual carrier measurement and the corresponding last known phase, system 10 provides a direct estimate of what the GPS carrier signal is. Because system 10 gives 50 Hz updates as opposed to the Kalman filter 1 Hz updates, system 10 provides more accurate GPS carrier signal measurements.

System 10 in GPS attitude determination systems includes two or more GPS receivers with antennae fixed to a platform. As discussed above, system 10 obtains an accurate measurement of the difference in carrier phase between GPS signal representations of GPS receivers 12 and 14. From the carrier phase measurement, platform orientation or attitude is determined.

Advantageously, system 10 provides an external measurement of the GPS carrier signal, which helps detect any carrier cycle slip—a problem in conventional GPS attitude determination designs even in State 5 (where both GPS carrier and code signals are detected).

While the embodiments illustrated in the FIGs. and described above are presently preferred, it should be understood that these embodiments are offered by way of example only. Other embodiments may include, for example, combinations of Kalman filters, dead reckoning techniques, and/or a second order tracking loop. The invention is not limited to a particular embodiment, but extends to various modifications, combinations, and permutations that nevertheless fall within the scope and spirit of the appended claims.

What is claimed is:

1. system for estimating the waveform of a global positioning system (GPS) carrier signal transmitted from at least one of a constellation of satellites in the GPS, the system comprising:

a receiver, the receiver including an antenna, the antenna capable of receiving GPS signals, the receiver using a second order code tracking loop to provide an estimated measurement of a velocity of the receiver at the antenna to estimate how fast the distance from a GPS satellite to the antenna is changing.

2. The system of claim 1, further comprising:

a code generator, the code generator generating the locally-generated code sequence for comparison with received GPS signals.

3. The system of claim 2, further comprising:

a code numerically controlled oscillator (NCO), the code NCO regulating the rate of the code generator.

4. The system of claim 3, further comprising:

a carrier numerically controlled oscillator (NCO), the carrier NCO regulating the rate by which a locally-generated signal is mixed with the received GPS signal.

5. The system of claim 4, further comprising:

a delay detector, the delay detector measuring code phase error in the GPS signal mixed with the locally-generated signal.

6. The system of claim 5, further comprising:

a code loop filter determining the rate of change required of the code NCO and the carrier NCO, wherein the rate of change required corresponds to how fast the distance from the GPS satellite to the antenna is changing.

7. The system of claim 6, wherein the code loop filter determines the rate of change from the code phase error determined by the delay detector.

8. The system of claim 1, further comprising a mixer to combine the locally-generated code sequence with the received GPS signals.

9. A system for estimating the waveform of a global positioning system (GPS) carrier signal transmitted from one of a constellation of satellites in the GPS, the system comprising:

means for receiving GPS signals;

means for generating a code sequence for comparison with the received GPS signals;

means for regulating the rate of the means for generating a code sequence;

means for regulating the rate by which a locally-generated signal is mixed with the received GPS signal;

means for measuring code phase error in the GPS signal mixed with the locally-generated signal; and means for determining the rate of change required of the regulating means, wherein the rate of change required of the regulating means corresponds to how fast the distance from the GPS satellite to the antenna is changing.

10. The system of claim 9, further comprising a means for mixing the code sequence with the received GPS signals.

11. The system of claim 9, wherein the code sequence generated for comparing with the received GPS signals is a pseudorandom (PRN) code corresponding to the satellite from which the GPS signal is received.

12. The system of claim 9, wherein the rate by which the locally-generated signal is mixed with the received GPS signal is approximately equal to $\frac{1}{8}^{th}$ the nominal chipping rate, 10.23 MHz.

13. The system of claim 9, wherein the rate of change required of the regulating means is determined from the code phase error.

14. The system of claim 9, further comprising a means for comparing a calculated phase angle of the received GPS signal to the calculated phase angle from another means for receiving GPS signals, whereby a more accurate measurement of the GPS signal is obtained.

15. A method of estimating the waveform of a global positioning system (GPS) carrier signal transmitted from one of a constellation of satellites in the GPS, the method comprising:

receiving a GPS signal into a receiving unit;

using a second order code tracking loop to provide an estimated measurement of a velocity of the receiving unit at an antenna to estimate how fast the distance from a GPS satellite to the antenna is changing.

16. The method of claim 15, wherein the locally-generated code sequence is a pseudorandom (PRN) code corresponding to the satellite from which the GPS signal is received.

17. The method of claim 15, further comprises:

mixing a locally-generated signal with the received GPS signal.

18. The method of claim 17, further comprises:

measuring code phase error in the GPS signal mixed with the locally-generated signal.

19. The method of claim 18, further comprises:

determining the rate of change of the locally-generated code sequence from the code phase error in the GPS signal mixed with the locally-generated signal.

20. The method of claim 17, further comprising:

comparing the phase of the mixture of the locally-generated signal and the received GPS signal to the phase determined by another receiving unit for a more accurate measurement of the actual phase of the GPS signal received.

* * * * *